US011048992B2

(12) United States Patent
Pedersen et al.

(10) Patent No.: US 11,048,992 B2
(45) Date of Patent: Jun. 29, 2021

(54) MANAGEMENT OF LARGE NUMBER OF RFID TAGS IN CRYOGENIC CONTAINER

(71) Applicant: VIKING GENETICS FMBA, Randers SØ (DK)

(72) Inventors: Gert Frølund Pedersen, Storvorde (DK); Jan Hvolgaard Mikkelsen, Støvring (DK); Ming Shen, Gistrup (DK); Shuai Zhang, Aalborg SV (DK); Dong Min Kim, Aalborg Øst (DK); Ondrej Franek, Aalborg Øst (DK)

(73) Assignee: Viking Genetics FMBA, Randers SO (DK)

( * ) Notice: Subject to any disclaimer, the term of this patent is extended or adjusted under 35 U.S.C. 154(b) by 0 days.

(21) Appl. No.: 16/615,973

(22) PCT Filed: May 24, 2018

(86) PCT No.: PCT/EP2018/063636
§ 371 (c)(1),
(2) Date: Nov. 22, 2019

(87) PCT Pub. No.: WO2018/215588
PCT Pub. Date: Nov. 29, 2018

(65) Prior Publication Data
US 2020/0097788 A1    Mar. 26, 2020

(30) Foreign Application Priority Data

May 24, 2017 (EP) .................................... 17172795

(51) Int. Cl.
*G06K 19/07* (2006.01)
*A01N 1/02* (2006.01)
(Continued)

(52) U.S. Cl.
CPC ....... *G06K 19/0723* (2013.01); *A01N 1/0273* (2013.01); *H01Q 1/2216* (2013.01); *H01Q 9/0421* (2013.01)

(58) Field of Classification Search
CPC .................................................. G06K 19/0723
See application file for complete search history.

(56) References Cited

U.S. PATENT DOCUMENTS

| 8,346,382 B2* | 1/2013 | Davidowitz | B01L 1/50 |
| | | | 700/125 |
| 8,952,815 B2* | 2/2015 | Smith | H01Q 21/245 |
| | | | 340/572.7 |

(Continued)

FOREIGN PATENT DOCUMENTS

| EP | 2743865 A1 | 6/2014 |
| WO | WO 2005/109332 A1 | 11/2005 |

(Continued)

OTHER PUBLICATIONS

Wen-Tzu Chen, "An Accurate Tag Estimate Method for Improving the Performance of an RFID Anticollision Algorithm Based on Dynamic Frame Length ALOHA", IEEE Transactions on Automation Science and Engineering, Jan. 2009, vol. 6, No. 1, 9-15.

*Primary Examiner* — K. Wong
(74) *Attorney, Agent, or Firm* — BakerHostetler (57) ABSTRACT

The present disclosure relates to a radio-frequency identification system for a container, such as a cryogenic container, comprising: a large number of radio-frequency identification tags for cryogenic straws, preferably at least 100 radio-frequency identification tags, each radio-frequency identification tag attachable to or embeddable in a cryogenic straw; an interrogation unit adapted to be placed or integrated inside the cryogenic container; wherein the interrogation unit and radio-frequency identification tags are configured to operate with a frequency of at least 30 MHz. The disclosure further relates to a method of identifying a large number of radio-frequency identification tags in a cryogenic container, preferably at least 100 radio-frequency identification tags, the method comprising the steps of: configuring a radio-frequency identification interrogation unit to transmit radio-frequency interrogation signals in the container with a frequency of at least 30 MHz; configuring the radio-frequency identification interrogation unit to operate in a plurality of different signal propagation modes such that the cryogenic container is divided into a plurality of propagation zones, wherein each propagation zone is associated with a corresponding propagation mode, and wherein only the radio-frequency identification tags within a specific propagation zone are excited when the interrogation unit is in the corresponding propagation mode; and configuring the radio- (Continued)

frequency identification interrogation unit to receive radio-frequency response signals from the radio-frequency identification tags.

20 Claims, 4 Drawing Sheets (51) Int. Cl.
*H01Q 1/22* (2006.01)
*H01Q 9/04* (2006.01)

(56) References Cited

U.S. PATENT DOCUMENTS

| | | | |
|---|---|---|---|
| 9,140,487 B2* | 9/2015 | Chaffey | G01K 1/022 |
| 9,418,265 B2* | 8/2016 | Morris | G06K 7/10356 |
| 9,589,225 B2* | 3/2017 | Morris | B01L 3/5453 |
| 9,740,897 B1* | 8/2017 | Salour | G06K 7/10366 |
| 10,726,218 B2* | 7/2020 | Koch | G01S 13/74 |
| 2010/0289623 A1 | 11/2010 | Roesner | |
| 2010/0302040 A1 | 12/2010 | Davidowitz et al. | |
| 2014/0159869 A1 | 6/2014 | Zumsteg et al. | |

FOREIGN PATENT DOCUMENTS

| | | |
|---|---|---|
| WO | WO 2014/006417 A1 | 1/2014 |
| WO | WO 2017/109153 A1 | 6/2017 |

* cited by examiner

MANAGEMENT OF LARGE NUMBER OF RFID TAGS IN CRYOGENIC CONTAINER

CROSS-REFERENCE TO RELATED APPLICATIONS

This application is the National Stage of International Patent Application No. PCT/EP2018/063636, filed May 24, 2018, which claims the benefit of European Patent Application No. 17172795.1 filed May 24, 2017, the disclosure of which is incorporated herein by reference in its entirety for any and all purposes.

The present disclosure relates to a method and a system for handling radio-frequency identification tags in a container, such as a cryogenic container. In particular the method and system are intended for handling large number of tightly spaced radio frequency identification (RFID) tags in a cryogenic container, preferably wherein the RFID tags are attached to cryogenic straws.

BACKGROUND OF INVENTION

Preserving organic material, such as DNA material and sperm samples, requires very low storing temperatures. This has long been achieved by cryogenic freezing where the organic samples are immersed in liquid nitrogen, which has a boiling temperature of −196° C. Cryonic storage at very cold temperatures increases longevity of cells significantly. The cryogenic temperature range has been defined as from −150° C. to absolute zero −273.15° C., the temperature at which molecular motion comes as close as theoretically possible to ceasing completely. When performing an audit of samples stored at cryogenic temperatures, it is desirable to minimize the time the samples spend outside the cryogenic environment. The biological samples may be preserved in individual plastic straws or vials. These vials are then bundled and immersed, typically in large quantities, in canisters, such as cryogenic storage dewars, filled with liquid nitrogen. Keeping track of the individual vials may involve a lot of manual labor, where the vials have to be temporarily removed from the canister for registration and subsequent book keeping.

Radio frequency identification technology has been widely used in many applications, for example supply chain management, goods tracking and logistics, but has still not been fully explored in relation to cryopreservation where stringent requirement challenges on reliabilities, form factors, and temperature range are present.

Cryopreservation containers for holding large number of cryogenic straws are typically small sized and may contain thousands of tightly spaced cryogenic straws. For example the diameter of a straw may be 2 mm and the distance between two neighboring straws less than 0.5 mm. This presents several challenges for identification of the samples, in particular since an RFID system for the purpose would need to be able to operate in temperature ranges from cryogenic temperatures to room temperature. Commercially available RFID solutions are typically able to operate to −80° C. but fail to activate the RFID tags below this temperature limit. State-of-the art RFID tags can operate in wider temperature ranges but suffer from large tag size or short reading distance, which are not suitable for handling of large number of tightly spaced RFID tags in cryogenic containers. Since the cryogenic straws are usually tightly packed, there is also mutual coupling between antennas of neighboring RFID tags to take into account. A further challenge of managing large number of RFID tags is that it may be a very time consuming task to identify the samples if the cryogenic container contains a large number of samples with individual identity.

SUMMARY OF INVENTION

The present disclosure relates to a method of identifying a large number of radio-frequency identification tags in a container, such as a cryogenic container, and to a radio-frequency identification system for a container, such as a cryogenic container, the system capable of handling a large number of radio-frequency identification tags in the needed temperature range. By incorporating a system for identifying the identification tags inside the container, samples do not have to be taken out of the container for identification.

By operating at high frequencies, such as in the range of 30 MHz-60 GHz, preferably in the range of 800-2500 MHz, or even at even higher frequencies, such as at least 60 GHz, the antennas of the RFID tags can be designed very thin and embedded or attached to the cryogenic straws. The inventors have found that radio propagation in liquid nitrogen (LN2) at these high frequencies is also suitable for achieving a functional RFID system for a large number of RFID tags in a cryogenic container. The interrogation unit of the RFID system may thus be placed inside a container holding the plurality of cryogenic straws and a cryogenic liquid. The liquid may be liquid nitrogen (LN2). The method and system may operate both at room temperature and at very low temperatures, for example including cryogenic temperatures.

In a first embodiment the present disclosure therefore relates to radio-frequency identification system for a cryogenic container comprising: a large number of radio-frequency identification tags for cryogenic straws, preferably at least 100 radio-frequency identification tags, each radio-frequency identification tag attachable to or embeddable in a cryogenic straw; an interrogation unit adapted to be placed on or integrated inside the cryogenic container; wherein the interrogation unit and radio-frequency identification tags are configured to operate in the range of 30 MHz and 60 GHz. The RFID system may be arranged to identify a large number of radio-frequency identification tags in a cryogenic container, preferably at least 100 radio-frequency identification tags. In particular, in order to increase the operation speed of the system, the cryogenic straws with attached RFID tags may be organized in clusters/holders/goblets inside the cryogenic container. The system may then be configured to perform a method comprising the steps of:
  configuring a radio-frequency identification interrogation unit to transmit radio-frequency interrogation signals in the cryogenic container in the range of between 30 MHz and 60 GHz;
  configuring the radio-frequency identification interrogation unit to operate in a plurality of different signal propagation modes such that the cryogenic container is divided into a plurality of propagation zones, wherein each propagation zone is associated with a corresponding propagation mode, and wherein only the radio-frequency identification tags within a specific propagation zone are excited when the interrogation unit is in the corresponding propagation mode; and
  configuring the radio-frequency identification interrogation unit to receive radio-frequency response signals from the radio-frequency identification tags.

One advantage of the method is that by using propagation modes and propagation zones, a reduced number of response signals are received, which may also receive the number of collisions. Accordingly, in one embodiment the propagation zones are configured such that only a reduced number of radio-frequency response signals from the radio-frequency identification tags are received. Large number of radio-frequency identification tags can be arranged in predetermined groups of radio-frequency identification tags. Each group may comprise at least 10 cryogenic straws, preferably at least 50 cryogenic straws, even more preferably at least 100 cryogenic straws. The propagation zones may be configured such that collisions between radio-frequency responses of the radio-frequency identification tags are reduced. In order to further increase the performance of the system an RFID anti-collision algorithm within the propagation zones may be applied. In this case the anti-collision algorithm will be less burdensome if the propagation modes are able to reduce the number of collisions by excluding responses from some of the groups of radio-frequency identification tags.

One way of achieving the plurality of propagation zones is by beamforming. By applying the proposed method the number of tags being interrogated at one moment can be reduced, which makes the handling of RFID tags faster and more efficient. The electromagnetic field produced by the RFID interrogation unit may be shaped so that it is stronger in some parts of the cryogenic container and weaker in others. Thus, tags in some selected part(s) of the container will receive enough power to respond, while at the same time others will be below threshold and remain silent. This way, it is possible to excite only a limited and controlled portion of the straws/tags and the communication protocol will have to deal with lower number of tags at the time. Also, if the field is focused in a well-defined and bounded space inside the container, the interrogation unit will know that the interrogated tags are placed in this space and may accordingly assign their presence to a corresponding cluster/holder/goblet. The user may thus be provided with localization support for finding a specific straw inside the cryogenic container.

In one embodiment of the presently disclosed radio-frequency identification system for a cryogenic container, the radio-frequency identification tags comprise tag dipole antennas attachable or embeddable in the cryogenic straws such that the tag dipole antennas are arranged vertically in the cryogenic container, and wherein the interrogation unit comprises at least one interrogation dipole antenna arranged in a vertical position. The at least one interrogation dipole antenna may for example be positioned in the top of the cryogenic container. Alternatively, the antenna may be a loop antenna or a combination of dipole and loop antenna. Furthermore, the antenna types may be mixed such that for example the radio-frequency identification tags are dipole antennas whereas the at least one interrogation dipole antenna is/are loop antenna(s) or other type of antennas. Other possible antenna types, both for the radio-frequency identification tags and for the interrogation unit are patch antennas, L-antennas, inverted F-antennas and planar inverted-F antennas, or combinations thereof.

In order to further increase the performance of the system an RFID anti-collision algorithm within the propagation zones may be applied. Within the context of the presently disclosed method and a system for handling a large number radio-frequency identification tags in a cryogenic container, it is proposed to apply a modified anti-collision algorithm, Q-algorithm, which is a variant of the dynamic frame slotted ALOHA (DFSA), by allowing interrogation unit to update the Q-value These and other aspects of the invention are set forth in the following detailed description if the invention.

DETAILED DESCRIPTION OF THE INVENTION

The present disclosure relates to a radio-frequency identification system for a cryogenic container comprising:
  a large number of radio-frequency identification tags for cryogenic straws, preferably at least 100 radio-frequency identification tags, each radio-frequency identification tag attachable to or embeddable in a cryogenic straw;
  an interrogation unit adapted to be placed or integrated inside the cryogenic container;
  wherein the interrogation unit and radio-frequency identification tags are configured to operate with a frequency of at least 30 MHz. The radio-frequency identification system for a cryogenic container may comprise a processing unit configured to perform a method of identifying radio-frequency identification tags in the cryogenic container. The method may comprise the step of configuring a radio-frequency identification interrogation unit to transmit radio-frequency interrogation signals in the cryogenic container in the range of between 30 MHz and 60 GHz. The method may further comprise the step of configuring the radio-frequency identification interrogation unit to operate in a plurality of different signal propagation modes such that the cryogenic container is divided into a plurality of propagation zones, wherein each propagation zone is associated with a corresponding propagation mode, and wherein only the radio-frequency identification tags within a specific propagation zone are excited when the interrogation unit is in the corresponding propagation mode. The method may further comprise the step of configuring the radio-frequency identification interrogation unit to receive radio-frequency response signals from the radio-frequency identification tags.

By sectorization of the container a considerably faster and more efficient management of large numbers of straws can be achieved. The straws may thereby be organized in clusters of straws inside the container. Beamforming is proposed as one way of reducing the number of tags being interrogated at one moment, which may ease the requirements to the communication protocol. The electromagnetic field produced by the radio-frequency identification interrogation unit may be shaped so that it is stronger in some parts of the container and weaker in others. Thus, tags in selected part(s) of the container may receive enough power to respond, while at the same time others will be below threshold and remain silent. It may thereby be possible to excite only a limited and controlled portion of the tags and the communication protocol will have to deal with significantly lower number of tags at the time. Moreover, if the field is focused in a well-defined and bounded space inside the container, the reader will know that the interrogated tags are placed right in this space and assign their presence to corresponding cluster/holder/goblet. This may provide users with some form of localization support for when they have to find a specific straw inside the container. Accordingly, in one embodiment of the presently disclosed method and system a physical location of at least one of the radio-frequency identification tags in the container is determined based on the received response from one of the propagation zones.

"Large number" of radio-frequency identification tags in relation to the presently disclosed method and system for identification of radio-frequency identification tags in a cryogenic container may refer to any useful number of tags and straws in the container. The method and system is applicable also on less than "large" amounts of tags, thus not limited to a certain amount of straws. The number of radio-frequency identification tags may nevertheless be at least 500, preferably at least 1000, more preferably at least 3000, even more preferably at least 5000.

Moreover, the presently disclosed system and method are suitable for "tightly spaced" cryogenic straws in a container. The method and system is applicable also on straws that are not "tightly spaced", thus not limited to a certain distance between the straws. However, cryopreservation containers for holding large number of cryogenic straws may contain thousands of tightly spaced cryogenic straws. For example the diameter of a straw may be 2 mm and the distance between two neighboring straws less than 5.0 mm, preferably less than 3.0 mm, even more preferably less than 1.0 mm, most preferably less than 0.5 mm.

Cryogenic refers to requiring or involving the use of very low temperatures. It is, generally, not well defined at what point on the temperature scale refrigeration ends and cryogenics begins but it is assumed that it start at approximately −150° C.

A cryogenic straw, or a cryopreservation straw, is a small storage device used for cryogenic storage of samples, typically sperm for in-vitro fertilization, but could be any form of bio-sample. Cryogenic straw in the present disclosure is used in a broad, conventional meaning for any vessel for this purpose. Typically the cryogenic straw is substantially tubular and thin in its shape.

Zone Partitioning, Beamforming

One aspect of the present disclosure relates to a method of identifying a large number of radio-frequency identification tags in a cryogenic container, preferably at least 100 radio-frequency identification tags, the method comprising the steps of:
  configuring a radio-frequency identification interrogation unit to transmit radio-frequency interrogation signals in the cryogenic container in the range of between 30 MHz and 60 GHz;
  configuring the radio-frequency identification interrogation unit to operate in a plurality of different signal propagation modes such that the cryogenic container is divided into a plurality of propagation zones, wherein each propagation zone is associated with a corresponding propagation mode, and wherein only the radio-frequency identification tags within a specific propagation zone are excited when the interrogation unit is in the corresponding propagation mode; and
  configuring the radio-frequency identification interrogation unit to receive radio-frequency response signals from the radio-frequency identification tags.

In one embodiment, the method operates at 300 MHz to 3 GHz, which is also known as the decimetre band, covering e.g. 400 MHz, 800 MHz and 2.45 MHz. As stated, the range may be further extended to 100 MHz to 10 GHz. The operating frequency range may also be 300 MHz to 1 GHz, or 300 MHz to 900 MHz, or covering only the highest range 2 GHz to 3 GHz. In environments and conditions in which radio communication is possible using lower frequencies than the abovementioned frequencies, the operation frequency may be 30-300 MHz By configuring the radio-frequency identification interrogation unit to operate in a plurality of different signal propagation modes, only a controlled portion of the tags are excited. This can be achieved for example by beamforming techniques. In one embodiment the method operates in a plurality of different signal propagation modes such that the cryogenic container is divided into a plurality of propagation zones by means of beamforming. The beamforming may be achieved by using multiple antennas connected to the reader. By properly positioning the antennas inside or near the opening of the container and applying proper weights to excitations of the antennas, a set of characteristic field modes corresponding to the propagation zones may be generated inside the container. In one embodiment of the presently disclosed method the beamforming is therefore achieved by a plurality of interrogation antennas connected to the interrogation unit. In such a configuration, preferably the interrogation antennas are positioned to operate in different propagation zones, preferably such that each interrogation antenna is associated with a corresponding propagation zone. The interrogation antennas may furthermore be configured to operate with individual amplification weight, thereby exciting only the tags of corresponding individual propagation zones.

Figure 3A:
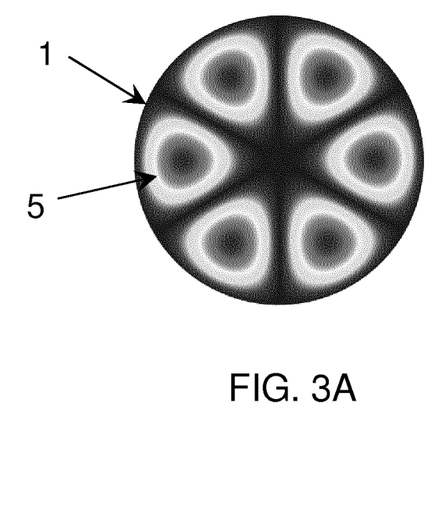
FIG. 3 shows magnitude of vertical electrical field in a cylindrical cryogenic container corresponding to a number of propagation zones. The magnitude of electrical field is represented in a cross-section of the cylindrical cryogenic container.
Figure 3B:
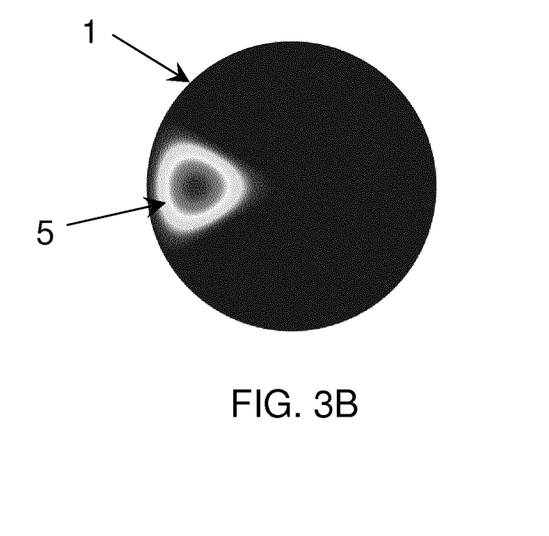

If the cryogenic container is cylindrical, the propagation zones may be similar to those in a cylindrical resonator. An example of such propagation zones is shown in FIG. 3A, which shows magnitudes of vertical electrical field in a cylindrical cryogenic container corresponding to a number of propagation zones. The magnitude of electrical field is represented in a cross-section of the cylindrical cryogenic container. In FIG. 3B only one specific propagation zone is activated in a specific propagation mode. According to the present invention the cryogenic container may therefore be divided into a number of physically defined propagation zones. In a vertically extending cryogenic container, such a cylinder-shaped container the step of configuring the radio-frequency identification interrogation unit to operate in a plurality of different signal propagation modes may therefore comprise the step of dividing the container into vertically extending segments by producing a number of controllable electromagnetic field configurations in the container. In the example of FIG. 3 a cross-section of the cryogenic container is divided into pie-shaped segments. The cryogenic container does not necessarily have to be cylindrical. The principle could be applied to any vertically extending container.

In one embodiment of the presently disclosed method the interrogation unit produces an electromagnetic field in the cryogenic container, wherein the electromagnetic field is shaped such that it is sufficiently strong for the tags to respond in at least one propagation zone, and sufficiently weak for the tags not to respond in at least one other propagation zone.

The number of possible propagation modes depends on a number of parameters such as the size and shape of the container, antenna characteristics, antenna positions etc. Number of modes that can be generated in a closed container of given dimensions is dependent on frequency of the electromagnetic field. The higher the frequency, the more modes can be generated. Therefore, using higher RFID band such as 2.45 GHz will allow having more modes and partitioning the tags inside into smaller groups than would be possible in the 900 MHz band. In one embodiment of the method the radio-frequency identification interrogation unit is configured to operate in at least 2 different signal propagation modes, preferably at least 3 different signal propagation modes, more preferably at least 4 different signal propagation modes, even more preferably at least 6 different signal propagation modes, most preferably at least 10 different signal propagation modes.

The radio-frequency identification tags may be divided into sub-groups corresponding to the propagation modes. In this embodiment, when the tags are stored in the canisters (sub-containers of the Dewar flask), their connection to the reader may be weak due to presence of the other tags which cause shadowing and strong mutual coupling. The connection to the reader can be improved by installing a repeater in each canister. The repeater may be a tag with one or more antennas that retransmits electromagnetic waves from the reader towards the sample tags and vice versa. Providing each canister with such a repeater improves the connection and also enable identification of the canister in which particular sample tag is located, thus helping with organization of the samples.

Signal Properties

The inventors have realized that in cryogenic containers comprising a liquefied gas such as liquid nitrogen, i.e. implicitly at extremely low temperatures, the propagation of radio waves is relatively close to that of air/gas. As a consequence, signal losses that would have been expected for high frequencies are not experienced. Therefore, according to one embodiment of the presently disclosed method and system of identifying a large number of radio-frequency identification tags, the radio-frequency identification interrogation unit is configured to transmit radio-frequency interrogation signals in the cryogenic container in the range of between 30 MHz and 60 GHz, preferably in the range of of between 30 MHz and 3 GHz, or in the range of 30 MHz and 100 GHz, or in the range of 60 GHz and 100 GHz, or in the range of between 100 MHz and 3 GHz, such as in a 900 MHz RFID band, or in a 2.45 GHz RFID band, or a combination. As stated the number of modes that can be generated in a closed vessel of given dimensions is dependent on frequency of the electromagnetic field. The higher the frequency, the more modes can be generated. In one embodiment the method operates at 300 MHz to 60 GHz. In another embodiment the method operates at 300 MHz to 3 GHz, which is also known as the decimetre band, covering e.g. 400 MHz, 800 MHz and 2.45 MHz. As stated, the range may be further extended to 100 MHz to 10 GHz. The operating frequency range may also be 300 MHz to 1 GHz, or 300 MHz to 900 MHz, or covering only the highest range 2 GHz to 3 GHz. In environments and conditions in which radio communication is possible using lower frequencies than the abovementioned frequencies, the operation frequency may be 30-300 MHz.

The radio-frequency identification interrogation unit may also be configured to transmit radio-frequency interrogation signals in the container above 60 GHz (i.e. mm waves). At 60 GHz the wavelength is 5 mm, which means that an efficient antenna at this frequency can be realized within 1 mm of size and placed at the end of the straw instead of its side. One advantage of this location is that the antenna is not shadowed by the other straws nearby and thus has unshaded access upwards towards the Dewar bottle opening where the reader is typically placed. From the wireless transmission formula it follows that if the gain of the antenna at one end of the wireless link is constant (tag on straw, antenna scaled with wavelength) while effective area of the antenna at the other end is constant (the reader, expected to have constant size), then the link budget does not vary with frequency. Hence, such a wireless link is expected to have no worse link budget than lower RFID bands. The link budget may be improved if the tag antenna is made directional towards the Dewar opening by extending it along the straw (e.g. a small Yagi-Uda antenna). On the other end of the link, the reader antenna will benefit from higher frequency in that it will be possible to realize it as a scanning directional array within reasonable size. Such an array will then be naturally capable of beamforming and consequently a) reducing the number of tags addressed in one scan, and b) locating particular tag inside the Dewar bottle.

Moreover the use of several different frequency bands may contribute to an even more efficient solution. Therefore, in one embodiment, the method further comprises the step of transmitting radio-frequency interrogation signals in the cryogenic container in several different frequency bands, thereby further distinguishing predefined groups of radio-frequency identification tags. Similarly, the frequency bands may be further divided into frequency channels. In one embodiment the presently disclosed method further comprises the step of transmitting radio-frequency interrogation signals in the cryogenic container in several different frequency channels with the frequency bands, thereby further distinguishing predefined sub-groups of radio-frequency identification tags. Preferably a solution for a specific cryogenic container with room for a given number of cryogenic straws will strike a balance between functionality, used frequencies, number of propagation modes and band- and frequency division. By operating at both ultra-high frequencies (UHF) (usually defined as a frequency range of between 300 MHz and 3 GHz, possibly extending to a range of 10-60 GHz or a range of between 100 MHz and 10 GHz) and very-high frequencies (VHF) (usually defined as a frequency range of between 30 MHz and 300 MHz) an optimal combination with band- and frequency division can be achieved.

Antenna Configurations

The antennas in the presently disclosed radio-frequency identification system may, as an example, be dipole antennas or dipole-like radiators. Typically the cryogenic straws are placed vertically (and tightly spaced) in the cryogenic container. The RFID tags can be designed as thin conductive threads that can be integrated in e.g. the sidewall of a substantially tubular cryogenic straw. In particular when operating at UHF/VHF such threads are advantageous. In one embodiment of the radio-frequency identification system for a cryogenic container, each radio-frequency identification tag comprises a tag dipole antenna attachable to or embeddable in a cryogenic straw such that the tag dipole antennas are arranged vertically in the cryogenic container, and wherein the interrogation unit comprises at least one interrogation dipole antenna arranged in a vertical position.

Figure 1:
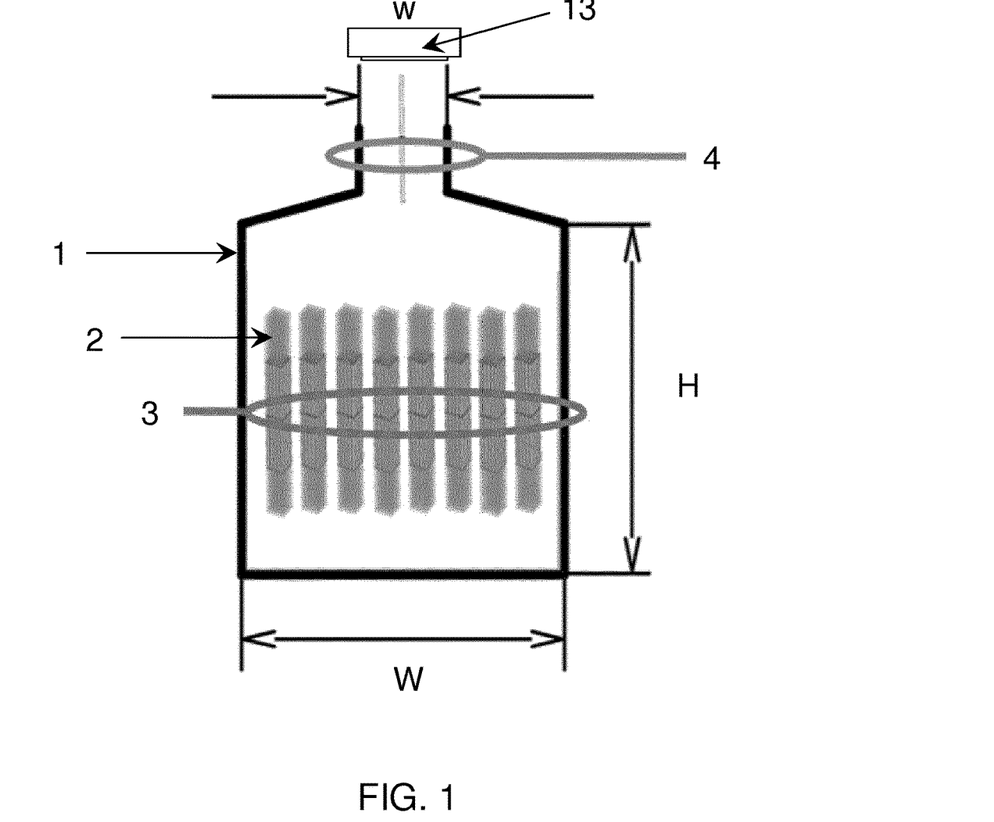
FIG. 1 shows a cryogenic container comprising a number of cryogenic straws with RFID each equipped with an antenna for RFID communication.
Figure 2:
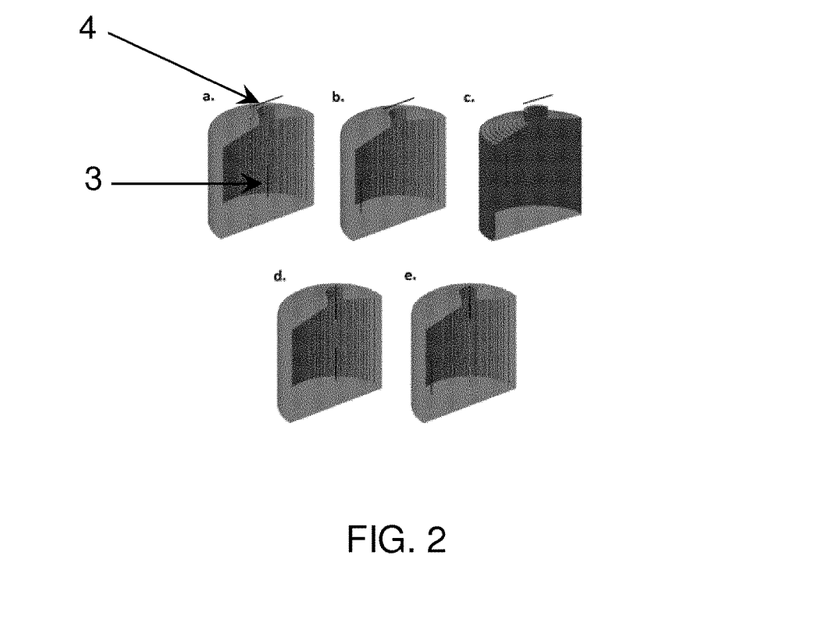
FIG. 2 (A-E) show variants of RFID interrogation antenna and RFID tag antenna configurations.

For the interrogation unit of the system, which may comprise at least one interrogation dipole antenna, the at least one interrogation dipole antenna may be positioned in the container opening, or above the container opening, or underneath the container opening inside the container opening, as shown in FIG. 1. The at least one interrogation dipole antenna may also be positioned in the container opening, or above the container opening, or underneath the container opening inside the container opening. A vertically oriented dipole antenna may be particularly advantageous. FIG. 2 shows a number of configurations of RFID interrogation antenna and RFID tag antenna configurations. In one embodiment the interrogation unit and/or the at least one interrogation dipole antenna are integrated in a container lid of the cryogenic container. The placement of the antenna(s) of the interrogation unit and the antennas of the the radio-frequency identification tags may be such that the distance between the radio-frequency identification tags and the antenna(s) of the interrogation unit is 2-30 cm, preferably 5-25 cm, more preferably 10-20 cm.

Although the system applicable also on less than "large" amounts of tags, thus not limited to a certain amount of straws, the presently disclosed system may comprise a large number of cryogenic straws, such as at least 100, preferably at least 500, more preferably at least 1000, most preferably at least 3000 cryogenic straws, wherein the radio-frequency identification tags are integrated in the cryogenic straws. The cryogenic straws with RFID tags may be tightly packed, such as having a distance of maximum 5 mm, preferably maximum 3 mm, even more preferably maximum 1 mm, most preferably maximum 0.5 mm of space between the cryogenic straws. Each radio-frequency identification tag comprising at least one integrated circuit configured to store information and generate a radio-frequency response signal in response to a radio-frequency interrogation signal.

Cryogenic refers to requiring or involving the use of very low temperatures. It is, generally, not well defined at what point on the temperature scale refrigeration ends and cryogenics begins but it is assumed that it start at approximately −150° C. The presently disclosed system and method may be operation in cryogenic temperatures, for example below −150° C., or below −170° C., or below −190° C. Preferably the system is also operational in higher temperatures, such as in a temperature range of between −196° C. and 60° C.

The presently disclosed radio-frequency identification system for a cryogenic container may be arranged to perform any version of the presently disclosed method of identifying a large number of radio-frequency identification tags in a cryogenic container. For this reason the interrogation antenna(s) of the system may be arranged to produce a plurality of propagation zone by beamforming. The interrogation antenna(s) may also be smart antenna(s), which refers to antenna arrays with smart signal processing algorithms used to identify spatial signal signature such as the direction of arrival (DOA) of the signal, and use it to calculate beamforming vectors, and/or to track and locate the antenna beam on the mobile/target. The interrogation antenna(s) may also be arranged to produce individual amplification weights, thereby exciting only the tags of corresponding individual propagation zones. The system may also comprise a cryogenic container and consequently such a cryogenic container may be divided into a plurality of propagation zones, wherein the interrogation unit is configured to operate to excite only the radio-frequency identification tags of programmed propagation zone(s). As explained in relation to the description of the method, the interrogation unit may be arranged to transmit radio-frequency interrogation signals in the cryogenic container in several different frequency bands, thereby further distinguishing predefined groups of radio-frequency identification tags.

The radio-frequency identification system for a cryogenic container may comprise a processing unit configured to perform a method of identifying radio-frequency identification tags in the cryogenic container. The processing unit may be arranged to perform additional tasks related to the operation of the system, such as keeping track of the propagation modes and zones or placement and/or grouping and IDs of straws.

Figure 4A:
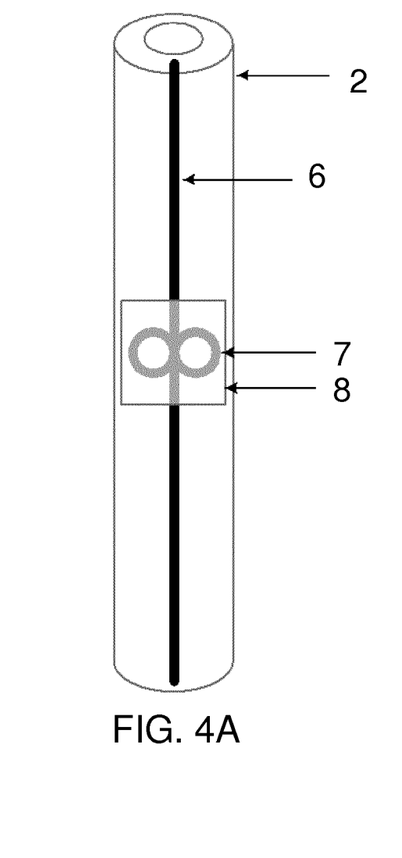
FIG. 4 shows an embodiment of an RFID solution for the presently disclosed method and a system for handling a large number of radio-frequency identification tags in a cryogenic container.

Preferably the RFID antennas for the RFID tags of the cryogenic straws are embedded/integrated in the walls of the straws. An energy/signal coupling shape can made during the manufacturing, which is illustrated as two rings in FIG. 4A. One way of manufacturing a suitable RFID tag solution for the presently disclosed method and system is to use an RFID module comprising an RFID chip and an energy/signal coupling shape, illustrated as a spiral in FIG. 4C. The RFID module may be attached to the straw by e.g. using glue that is reliable at cryogenic temperatures.

A small tag to tag distance may lead to strong mutual couplings among the neighboring tag antennas, which may lead to a reduction of the total efficiency of tag antennas. A good impedance matching may lead to a lower total efficiency. There is a trade-off between impedance matching and mutual coupling. Utilizing this property, it is possible to make the tag adapted for both freespace and closely packed with other tags. Furthermore, in order to limit coupling, very high frequencies, such as 30-100 GHz may be used. Due to smaller wavelengths, the tag antenna can also be smaller and mounted at the end of the straw. Higher frequencies give larger electrical distance between tag antennas so that mutual coupling can be reduced.

Interrogation of Multiple Tags

The cryogenic container may comprise a large number of straws and RFID tags, such as over 1000 RFID tags. In order to find a tag within such a large amount of tags an anti-collision may be applied. Therefore, in one embodiment of the presently disclosed method and system for identification of a large number of radio-frequency identification tags the method further comprises the step of interrogating multiple radio-frequency identification tags within a propagation zone by applying an RFID anti-collision algorithm.

The anti-collision algorithm may be a Q-algorithm, which is a variant of the dynamic frame slotted ALOHA (DFSA). An example of such an algorithm may be implemented as follows: A reader may initiate an interrogation process by Select command to select proper group of tags. The reader starts an inventory process by sending the Query command with a specific integer value within 0 to 15, which is called Q value and represents that the length of frame is $2^Q$. If the Query command is successfully received by the tags, each tag will generate 16 bit random number (RN16) and extract the last Q bits in order to set its slot counter as $2^Q-1$. After sending Query command, the reader can send QueryRep, QueryAdj, or ACK commands according to the situation. Each tag will decrease its counter by one if it receives QueryRep command from the reader. This means that the slot in a frame will progress only if the reader transmits QueryRep command. When the slot counters of any tags reach zero, the tags send their RN16 back to the reader. If only single tag transmits, the reader can receive it correctly. The reader will then respond with ACK command. After receiving ACK from the reader, the tag transmits its real identification information (ID). The reader counts the number of successful interrogations to decrease Q value and collided responses to increase Q value for the next inventory process. The unacknowledged tags wait for the QueryAdj command which informs updated Q value that may be decreased or increased. This means that a given frame can be finished early and new frame will start. Hence if QueryAdj command is received by tags, each tag will select new RN16.

The proposed solution is here to allow the RFID reader to update the Q-value based on Table 1. Table 1 is an expansion of the number of tags up to 15000 in relation to previous publication (Wen-Tzu Chen, "An Accurate Tag Estimate Method for Improving the Performance of an RFID Anti-collision Algorithm Based on Dynamic Frame Length ALOHA," IEEE Transactions on Automation Science and Engineering, vol 6, no. 1, January 2009).

TABLE 1

| Q | Frame length ($2^Q$) | Tag quantity |
|---|---|---|
| 0 | 1 | 1 |
| 1 | 2 | 2 |
| 2 | 4 | 3-5 |
| 3 | 8 | 6-11 |
| 4 | 16 | 12-22 |
| 5 | 32 | 23-44 |
| 6 | 64 | 45-88 |
| 7 | 128 | 89-177 |
| 8 | 256 | 178-354 |
| 9 | 512 | 355-709 |
| 10 | 1024 | 710-1419 |
| 11 | 2048 | 1420-2839 |
| 12 | 4096 | 2840-5678 |
| 13 | 8192 | 5679-11356 |
| 14 | 16384 | 11357-15000 |

Figure 7:
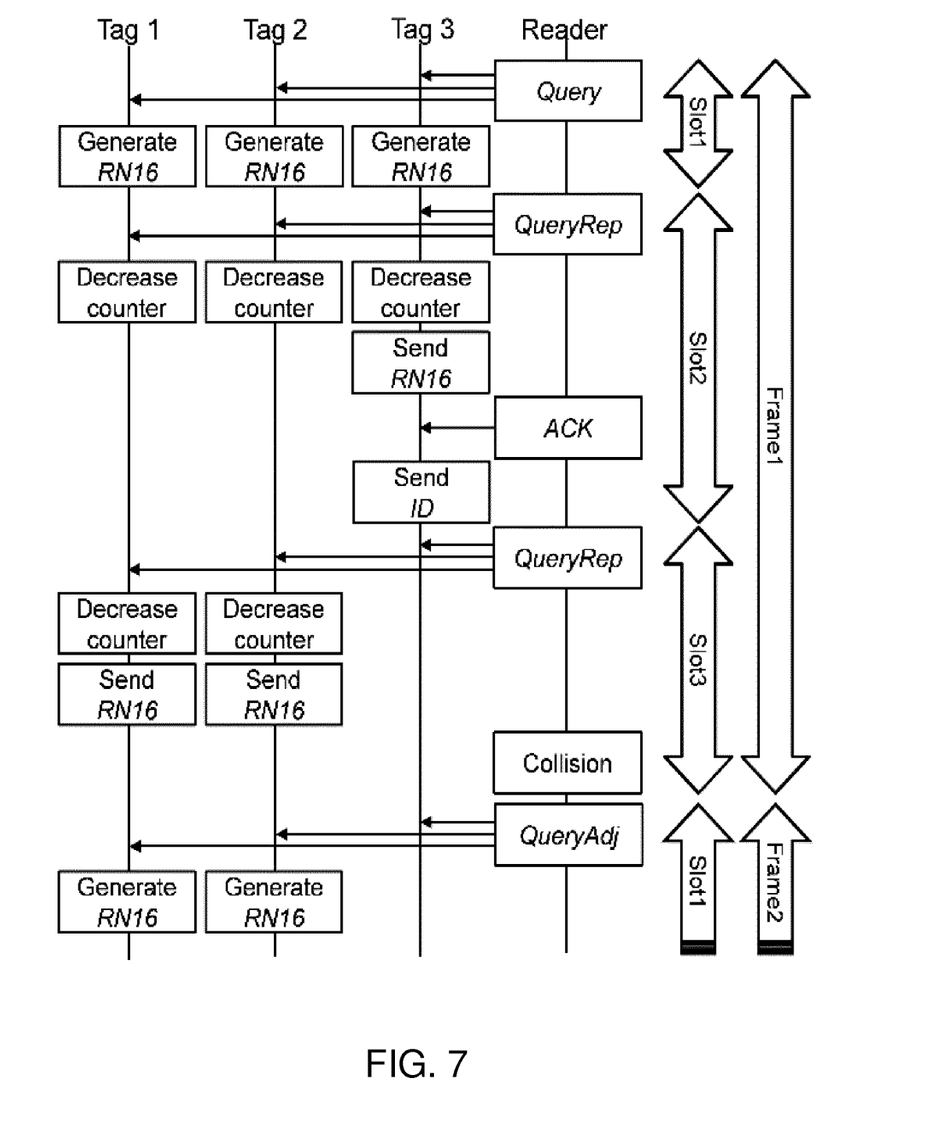
FIG. 7 shows an example of an anti-collision method for identification of multiple RFID tags.

FIG. 7 shows the example of anti-collision method described in the present disclosure using three tags and one reader. Tag 3 reaches the zero value and succeeds its interrogation. On the other hand Tag 1 and Tag 2 reach the zero value at the same time and it causes collision at the reader. Based on the information from previous frame information, the reader will adjust the frame length and start with a new frame.

Cryogenic Container

The present disclosure further relates to a cryogenic container comprising the radio-frequency identification system as described above. The cryogenic container may comprise a lid, in which the at least one interrogation antenna is integrated. In a further embodiment also the interrogation unit is integrated in the lid. Such a container may be delivered as a complete system that can be sold with computer software for managing and controlling the system. The cryogenic container may be a cryogenic storage dewar and may further comprise liquefied natural gas.

DETAILED DESCRIPTION OF DRAWINGS

The invention will in the following be described in greater detail with reference to the accompanying drawings. The drawings are exemplary and are intended to illustrate some of the features of the presently disclosed system and method of identifying a large number of radio-frequency identification tags, and are not to be construed as limiting to the presently disclosed invention.

FIG. 1 shows a cryogenic container (1) comprising a number of cryogenic straws (2) with RFID each equipped with an antenna (3) for RFID communication. This example of a cryogenic container (1) is cylindrical and has a height H and a width W. An interrogation antenna (4) is positioned in the container opening in a vertical orientation. The cryogenic container (4) has a lid (13).

FIG. 2 (A-E) show variants of RFID interrogation antenna (4) and RFID tag antenna (3) configurations. In FIG. 2A a horizontally oriented dipole antenna (4) is positioned above the opening of the container, and a vertically oriented RFID tag antenna (3) positioned in the center of the container. In FIGS. 2B-C a horizontally oriented dipole antenna (4) is positioned above the opening of the container, and a vertically oriented RFID tag antenna (3) positioned near the wall of the container. In FIG. 2D a vertically oriented dipole antenna (4) is positioned in the opening of the container, and a vertically oriented RFID tag antenna (3) positioned in the center of the container. In FIG. 2E a vertically oriented dipole antenna (4) is positioned in the opening of the container, and a vertically oriented RFID tag antenna (3) positioned near the wall of the container.

FIG. 3 shows magnitude of vertical electrical field in a cylindrical cryogenic container corresponding to a number of propagation zones. The magnitude of electrical field is represented in a cross-section of the cylindrical cryogenic container. The color-coding should be understood in such a way that the field is strongest in the red colored areas, whereas zero or almost zero in the blue areas. In this scenario, those tags present in the strong field areas will respond, while those in the weak areas will stay silent. This field distribution can be achieved with only one reader antenna. In FIG. 3B only one specific propagation zone is activated in a specific propagation mode. FIG. 3B can be seen as a picture of how the field distribution would look like if the field was focused into one segment of the container. This can be achieved using multiple reader antennas with appropriate weights. Only tags in a small segment of the container are excited and their position thus becomes known.

Figure 4B:
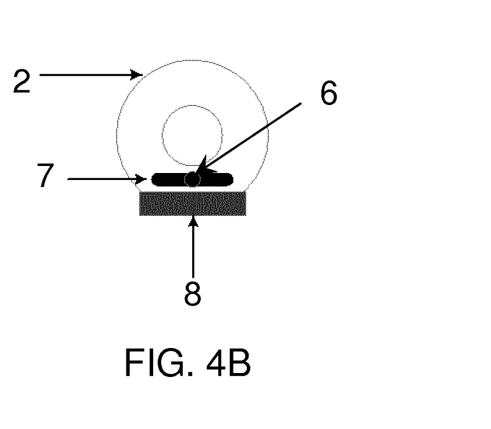
Figure 4C:
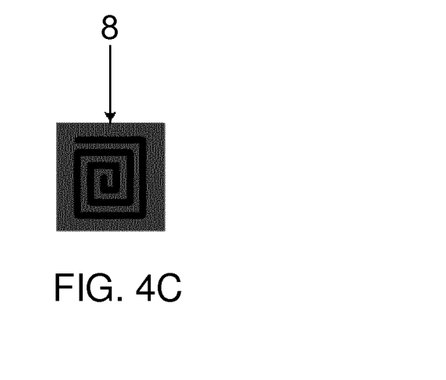

FIG. 4 shows an embodiment of an RFID solution for the presently disclosed method and a system for handling a large number radio-frequency identification tags in a cryogenic container. A cryogenic straw (2) has a conductive thread (6) embedded in the sidewall. The two rings (7) illustrate an energy/signal coupling to the antenna (6) in the form of a thread. The RFID tag further comprises an RFID chip (8).

Figure 5:
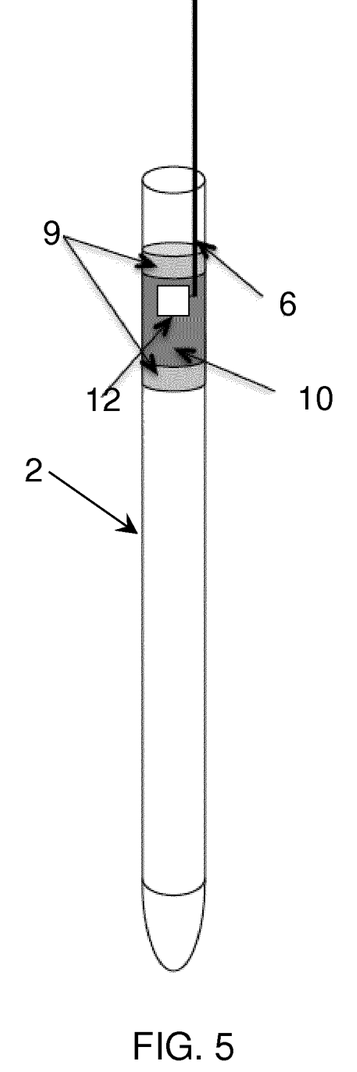
FIG. 5-6 show further embodiments of RFID solutions for the presently disclosed method and a system for handling a large number of radio-frequency identification tags in a cryogenic container.
Figure 6:
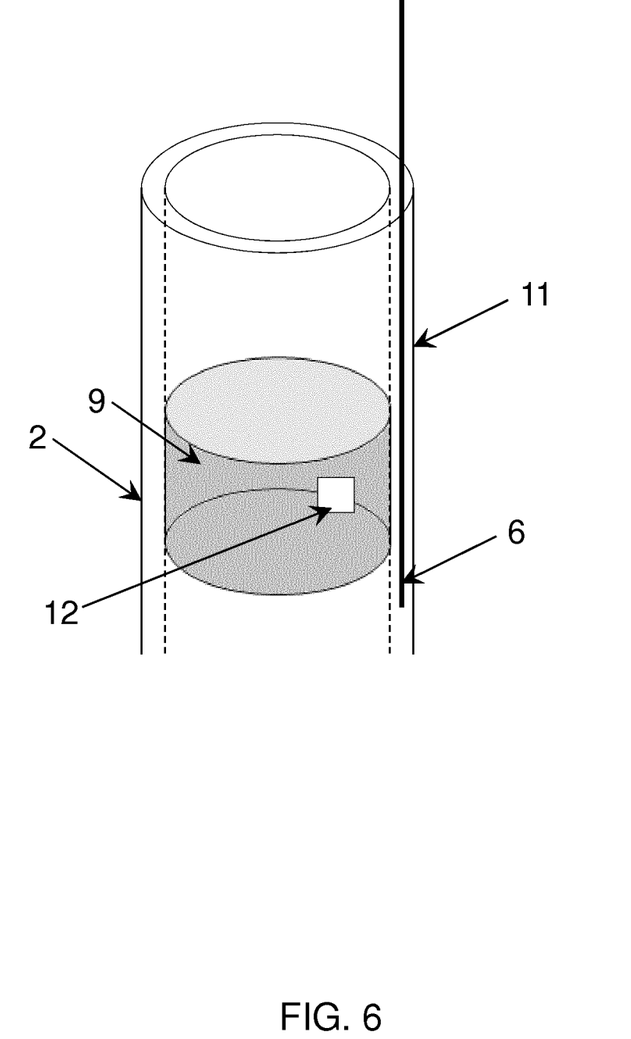

FIG. 5-6 show further embodiments of RFID solutions for the presently disclosed method and a system for handling a large number radio-frequency identification tags in a cryogenic container. FIG. 5 shows one embodiment of an RFID tag. The RFID tag has one integrated circuit (12) embedded in a sealing element (9) having two parts and an electrically isolation middle medium (10), and one antenna (6) extending upwards in the longitudinal direction of the straw. The antenna (6) may be integrated, such as cast into the sidewall of the straw (1). In FIG. 6 the antenna (6) is cast into a sidewall (11) of the cryogenic straw (2). In this example the integrated circuit (12) is embedded in a sealing element (9), sealingly and slidably engaging inside the straw (2). The integrated circuit (12) is connected wirelessly to the antenna (6). In the example, the antenna (6) is partly sealed inside the sidewall (11) (sealed in all directions except upwards).

FIG. 7 shows an example of an anti-collision method for identification of multiple RFID tags.

FURTHER DETAILS OF THE INVENTION

1. A method of identifying a large number of radio-frequency identification tags in a container, such as a cryogenic container, preferably at least 100 radio-frequency identification tags, the method comprising the steps of:
   configuring a radio-frequency identification interrogation unit to transmit radio-frequency interrogation signals in the container with a frequency of at least 30 MHz;
   configuring the radio-frequency identification interrogation unit to operate in a plurality of different signal propagation modes such that the container is divided into a plurality of propagation zones, wherein each propagation zone is associated with a corresponding propagation mode, and wherein only the radio-frequency identification tags within a specific propagation zone are excited when the interrogation unit is in the corresponding propagation mode; and
   configuring the radio-frequency identification interrogation unit to receive radio-frequency response signals from the radio-frequency identification tags.
2. The method of identifying a large number of radio-frequency identification tags according to any of the preceding items, wherein the propagation zones are configured such that only a reduced number of radio-frequency response signals from the radio-frequency identification tags are received.
3. The method of identifying a large number of radio-frequency identification tags according to any of the preceding items, wherein the propagation zones are configured according to a predetermined arrangement of groups of radio-frequency identification tags.
4. The method of identifying a large number of radio-frequency identification tags according to item 3, wherein the predetermined arrangement of groups comprises at least two groups, each group comprising at least 10 cryogenic straws, preferable at least 50 cryogenic straws, even more preferably at least 100 cryogenic straws.
5. The method of identifying a large number of radio-frequency identification tags according to any of the preceding items, wherein the propagation zones are configured such that collisions between radio-frequency responses of the radio-frequency identification tags are reduced.
6. The method of identifying a large number of radio-frequency identification tags according to any of the preceding items, further comprising the step of applying an anti-collision for identifying the radio-frequency identification tags within a propagation zone.
7. The method of identifying a large number of radio-frequency identification tags according to any of the preceding items, wherein the step of configuring the radio-frequency identification interrogation unit to operate in a plurality of different signal propagation modes such that the container is divided into a plurality of propagation zone is achieved by beamforming.
8. The method of identifying a large number of radio-frequency identification tags according to item 7, wherein the beamforming is achieved by a plurality of interrogation antennas connected to the interrogation unit.
9. The method of identifying a large number of radio-frequency identification tags according to item 8, wherein the interrogation antennas are positioned to operate in different propagation zones, preferably such that each interrogation antenna is associated with a corresponding propagation zone.
10. The method of identifying a large number of radio-frequency identification tags according to any of items 8-9, wherein individual amplification weights are employed by the interrogation antennas, thereby exciting only the tags of corresponding individual propagation zones.
11. The method of identifying a large number of radio-frequency identification tags according to any of the preceding items, wherein the radio-frequency identification tags are integrated in cryogenic straws.
12. The method of identifying a large number of radio-frequency identification tags according to any of the preceding items, wherein the interrogation unit produces an electromagnetic field in the container, and wherein the electromagnetic field is shaped such that it is sufficiently strong for the tags to respond in at least one propagation zone, and sufficiently weak for the tags not to respond in at least one other propagation zone.
13. The method of identifying a large number of radio-frequency identification tags according to any of the preceding items, wherein the container is divided into a number of physically defined propagation zones.
14. The method of identifying a large number of radio-frequency identification tags according to any of the preceding items, wherein the container is a vertically extending container, such as a cylinder-shaped container, wherein the step of configuring the radio-frequency identification interrogation unit to operate in a plurality of different signal propagation modes comprises the step of dividing the container into vertically extending segments by producing a number of controllable electromagnetic field configurations in the container.
15. The method of identifying a large number of radio-frequency identification tags according to item 14, wherein a cross-section of the container is divided into substantially pie-shaped segments.
16. The method of identifying a large number of radio-frequency identification tags according to any of the preceding items, further comprising the step of determining a physical location of a radio-frequency identification tag in the container based on the received response from one of the propagation zones.
17. The method of identifying a large number of radio-frequency identification tags according to any of the preceding items, wherein the radio-frequency identification interrogation unit is configured to transmit radio-frequency interrogation signals in the container in the range of between 30 MHz and 60 GHz, preferably in the range of of between 30 MHz and 3 GHz, or in the range of 30 MHz and 100 GHz, or in the range of 60 GHz and 100 GHz, or in the range of between 100 MHz and 3 GHz, such as in a 900 MHz RFID band, or in a 2.45 GHz RFID band, or a combination.
18. The method of identifying a large number of radio-frequency identification tags according to any of the preceding items, wherein the radio-frequency identification interrogation unit is configured to operate in at least 2 different signal propagation modes, preferably at least 3 different signal propagation modes, more preferably at least 4 different signal propagation modes, even more preferably at least 6 different signal propagation modes, most preferably at least 10 different signal propagation modes.
19. The method of identifying a large number of radio-frequency identification tags according to any of the preceding items, wherein the number of radio-frequency identification tags is at least 500, preferably at least 1000, more preferably at least 3000, even more preferably at least 5000.
20. The method of identifying a large number of radio-frequency identification tags according to any of the preceding items, further comprising the step of transmitting radio-frequency interrogation signals in the container in several different frequency bands, thereby further distinguishing predefined groups of radio-frequency identification tags.
21. The method of identifying a large number of radio-frequency identification tags according to item 20, further comprising the step of transmitting radio-frequency interrogation signals in the container in several different frequency channels with the frequency bands, thereby further distinguishing predefined sub-groups of radio-frequency identification tags.
22. The method of identifying a large number of radio-frequency identification tags according to any of the preceding items, further comprising the step of interrogating multiple radio-frequency identification tags within a propagation zone by applying an RFID anti-collision algorithm.
23. The method of identifying a large number of radio-frequency identification tags according to any of the preceding items, further comprising the step of configuration a processing unit to keep track of partitioning of the propagation
24. A radio-frequency identification system for a cryogenic container comprising:
    a large number of radio-frequency identification tags for cryogenic straws, preferably at least 100 radio-frequency identification tags, each radio-frequency identification tag attachable to or embeddable in a cryogenic straw;
    an interrogation unit adapted to be placed or integrated inside the cryogenic container;
    wherein the interrogation unit and radio-frequency identification tags are configured to operate with a frequency of at least 30 MHz.
25. The radio-frequency identification system for a cryogenic container according to item 24, wherein each radio-frequency identification tag comprises a tag dipole antenna attachable to or embeddable in a cryogenic straw such that the tag dipole antennas are arranged vertically in the cryogenic container, and wherein the interrogation unit comprises at least one interrogation dipole antenna arranged in a vertical position.
26. The radio-frequency identification system for a cryogenic container according to item 24, wherein each radio-frequency identification tag comprises a patch antenna, or an L-antenna, or an inverted F-antenna or a planar inverted-F antenna attachable to or embeddable in a cryogenic straw such that the tag dipole antennas are arranged vertically in the cryogenic container, and wherein the interrogation unit comprises a patch antenna, or an L-antenna, or an inverted F-antenna or a planar inverted-F antenna.
27. The radio-frequency identification system for a cryogenic container according to any of items 24-26, further comprising a cryogenic container.
28. The radio-frequency identification system for a cryogenic container according to any of items 24-27, wherein the at least one interrogation dipole antenna is positioned in the container opening, or above the container opening, or underneath the container opening inside the container opening.
29. The radio-frequency identification system for a cryogenic container according to any of items 24-28, wherein the interrogation unit and/or the at least one interrogation dipole antenna is integrated in a container lid of the cryogenic container.
30. The radio-frequency identification system for a cryogenic container according to any of items 24-29, further comprising a large number of cryogenic straws, such as at least 100, preferably at least 500, more preferably at least 1000, most preferably at least 3000 cryogenic straws, even more preferably at least 5000, wherein the radio-frequency identification tags are integrated in the cryogenic straws.
31. The radio-frequency identification system for a cryogenic container according to any of items 24-30, wherein the straws are tightly packed, such as having a distance of maximum 5 mm, preferably maximum 3 mm, even more preferably maximum 1 mm, most preferably maximum 0.5 mm of space between the straws.
32. The radio-frequency identification system for a cryogenic container according to any of items 24-31, each radio-frequency identification tag comprising at least one integrated circuit configured to store information and generate a radio-frequency response signal in response to a radio-frequency interrogation signal.
33. The radio-frequency identification system for a cryogenic container according to any of items 24-32, comprising a processing unit configured to perform the method of identifying a large number of radio-frequency identification tags according to any of items 1-23.
34. The radio-frequency identification system for a cryogenic container according to any of items 24-33, wherein the interrogation antenna(s) is/are configured to produce a plurality of propagation zone by beam-forming.
35. The radio-frequency identification system for a cryogenic container according to any of items 24-34, wherein the interrogation antenna(s) is/are smart antenna(s).
36. The radio-frequency identification system for a cryogenic container according to any of items 24-35, wherein the interrogation antenna(s) is/are configured to produce individual amplification weights, thereby exciting only the tags of corresponding individual propagation zones.
37. The radio-frequency identification system for a cryogenic container according to any of items 24-36, wherein the cryogenic container is divided into a plurality of propagation zones, and wherein the interrogation unit is configured to operate to excite only the radio-frequency identification tags of programmed propagation zone(s).
38. The radio-frequency identification system for a cryogenic container according to any of items 24-37, wherein the interrogation unit is configured to transmit radio-frequency interrogation signals in the cryogenic container in several different frequency bands, thereby further distinguishing predefined groups of radio-frequency identification tags.
39. The radio-frequency identification system for a cryogenic container according to any of items 24-38, wherein sub-groups of radio-frequency identification tags are placed in sub-containers (canisters)

40. The radio-frequency identification system for a cryogenic container according to item 39, wherein each sub-container comprises a repeater for retransmitting radio waves between the radio-frequency identification tags and the interrogation unit.

41. The radio-frequency identification system for a cryogenic container according to any of items 24-40, the system being arranged to operate in a temperature range of between −196° C. and 60° C.

42. The radio-frequency identification system for a cryogenic container according to any of items 24-41, wherein the radio-frequency identification tags and the antenna(s) of the interrogation unit are arranged such the distance between the radio-frequency identification tags and the antenna(s) of the interrogation unit is 2-30 cm, preferably 5-25 cm, more preferably 10-20 cm.

43. The radio-frequency identification system for a cryogenic container according to any of items 24-42, wherein said interrogation unit is configured to operate in a plurality of different signal propagation modes, thereby diving the container into a plurality of propagation zones, wherein each propagation zone is associated with a corresponding propagation mode, and wherein only the radio-frequency identification tags within a specific propagation zone are excited when the interrogation unit is in the corresponding propagation mode.

44. The radio-frequency identification system for a cryogenic container according to item 43, wherein the propagation zones are configured such that only a reduced number of radio-frequency response signals from the radio-frequency identification tags are received.

45. The radio-frequency identification system for a cryogenic container according to any of items 24-44, configured to perform the method of identifying a large number of radio-frequency identification tags according to any of items 1-23.

46. A cryogenic container comprising the radio-frequency identification system of any of items 24-42.

47. The cryogenic container according to item 46, the cryogenic container comprising a lid, wherein the at least one interrogation antenna is integrated in the lid.

48. The cryogenic container according to item 47, wherein the interrogation unit is integrated in the lid.

49. The cryogenic container according to any of items 46-48, further comprising liquid nitrogen.

50. The cryogenic container according to any of items 46-48, wherein the cryogenic container is a cryogenic storage dewar.

REFERENCE

International application PCT/EP2016/082514, "RFID system for identification of cryogenic straws", is hereby incorporated by reference in its entirety.

The invention claimed is:

1. A method of identifying a large number of radio-frequency identification tags, the number of radio-frequency identification tags being at least 100, in a cryogenic container, the method comprising the steps of:
configuring a radio-frequency identification interrogation unit connected to a plurality of interrogation antennas to transmit radio-frequency interrogation signals in the cryogenic container with a frequency of at least 30 MHz;
configuring the radio-frequency identification interrogation unit to operate in a plurality of different signal propagation modes by applying beamforming such that the cryogenic container is divided into a plurality of propagation zones, each propagation zone comprising a group of radio-frequency identification tags, wherein each propagation zone is associated with a corresponding propagation mode, wherein the interrogation antennas are configured to apply individual beams associated with the propagation zones and to operate with individual amplification weights such that only the radio-frequency identification tags within a specific propagation zone are excited when the interrogation unit is in the corresponding propagation mode; and
configuring the radio-frequency identification interrogation unit to receive radio-frequency response signals from the radio-frequency identification tags.

2. The method of claim 1, wherein the propagation zones are configured such that only a reduced number of radio-frequency response signals from the radio-frequency identification tags are received.

3. The method of claim 1, wherein the propagation zones are configured according to a predetermined arrangement of groups of radio-frequency identification tags.

4. The method of claim 3, wherein the predetermined arrangement of groups comprises at least two groups, each group comprising at least 10 cryogenic straws, preferable at least 50 cryogenic straws, even more preferably at least 100 cryogenic straws.

5. The method of claim 1, wherein the propagation zones are configured such that collisions between radio-frequency responses of the radio-frequency identification tags are reduced.

6. The method of claim 1, further comprising the step of applying an anti-collision for identifying the radio-frequency identification tags within a propagation zone.

7. The method of claim 1, wherein the interrogation unit produces an electromagnetic field in the cryogenic container, and wherein the electromagnetic field is shaped such that it is sufficiently strong for the tags to respond in at least one propagation zone, and sufficiently weak for the tags not to respond in at least one other propagation zone.

8. The method of claim 1, further comprising the step of determining a physical location of a radio-frequency identification tag in the cryogenic container based on the received response from one of the propagation zones.

9. The method of claim 1, further comprising the step of transmitting radio-frequency interrogation signals in the cryogenic container in several different frequency bands, thereby further distinguishing predefined groups of radio-frequency identification tags, optionally further comprising the step of transmitting radio-frequency interrogation signals in the cryogenic container in several different frequency channels with the frequency bands, thereby further distinguishing predefined sub-groups of radio-frequency identification tags.

10. The method of claim 1, further comprising the step of interrogating multiple radio-frequency identification tags within a propagation zone by applying an RFID anti-collision algorithm.

11. A radio-frequency identification system for a cryogenic container comprising:
a large number of radio-frequency identification tags for cryogenic straws, preferably at least 100 radio-frequency identification tags, each radio-frequency identification tag attachable to or embeddable in a cryogenic straw;

an interrogation unit adapted to be placed or integrated inside the cryogenic container; and a plurality of interrogation antennas connected to the interrogation unit; wherein the interrogation unit and radio-frequency identification tags are configured to operate with a frequency of at least 30 MHz, the interrogation unit further configured to operate in a plurality of different signal propagation modes by applying beamforming such that the cryogenic container is divided into a plurality of propagation zones, each propagation zone comprising a group of radio-frequency identification tags, wherein each propagation zone is associated with a corresponding propagation mode, the interrogation antennas being configured to apply individual beams associated with the propagation zones and to operate with individual amplification weights such that only the radio-frequency identification tags within a specific propagation zone are excited when the interrogation unit is in the corresponding propagation mode.

12. The radio-frequency identification system of claim 11, wherein each radio-frequency identification tag comprises a tag dipole antenna attachable to or embeddable in a cryogenic straw such that the tag dipole antennas are arranged vertically in the cryogenic container, and wherein the interrogation unit comprises at least one interrogation dipole antenna arranged in a vertical position.

13. The radio-frequency identification system of claim 12, wherein each radio-frequency identification tag comprises a patch antenna, or an L-antenna, or an inverted F-antenna or a planar inverted-F antenna attachable to or embeddable in a cryogenic straw such that the tag dipole antennas are arranged vertically in the cryogenic container, and wherein the interrogation unit comprises a patch antenna, or an L-antenna, or an inverted F-antenna or a planar inverted-F antenna.

14. The radio-frequency identification system of claim 11, further comprising a large number of cryogenic straws, such as at least 100, preferably at least 500, more preferably at least 1000, most preferably at least 3000 cryogenic straws, even more preferably at least 5000, wherein the radio-frequency identification tags are integrated in the cryogenic straws.

15. The radio-frequency identification system of claim 11, wherein the straws are tightly packed, such as having a distance of maximum 5 mm, preferably maximum 3 mm, even more preferably maximum 1 mm, most preferably maximum 0.5 mm of space between the straws.

16. The radio-frequency identification system of claim 11, wherein the interrogation unit is configured to transmit radio-frequency interrogation signals in the cryogenic container in several different frequency bands, thereby further distinguishing predefined groups of radio-frequency identification tags.

17. The radio-frequency identification system of claim 11, wherein said interrogation unit is configured to operate in a plurality of different signal propagation modes, thereby diving the cryogenic container into a plurality of propagation zones, wherein each propagation zone is associated with a corresponding propagation mode, and wherein only the radio-frequency identification tags within a specific propagation zone are excited when the interrogation unit is in the corresponding propagation mode.

18. The radio-frequency identification system of claim 17, wherein the propagation zones are configured such that only a reduced number of radio-frequency response signals from the radio-frequency identification tags are received.

19. The radio-frequency identification system of claim 11, configured to perform the method of identifying a large number of radio-frequency identification tags according to any of claims 1-10.

20. A cryogenic container comprising the radio-frequency identification system of claim 11.

* * * * *